Figure 1:
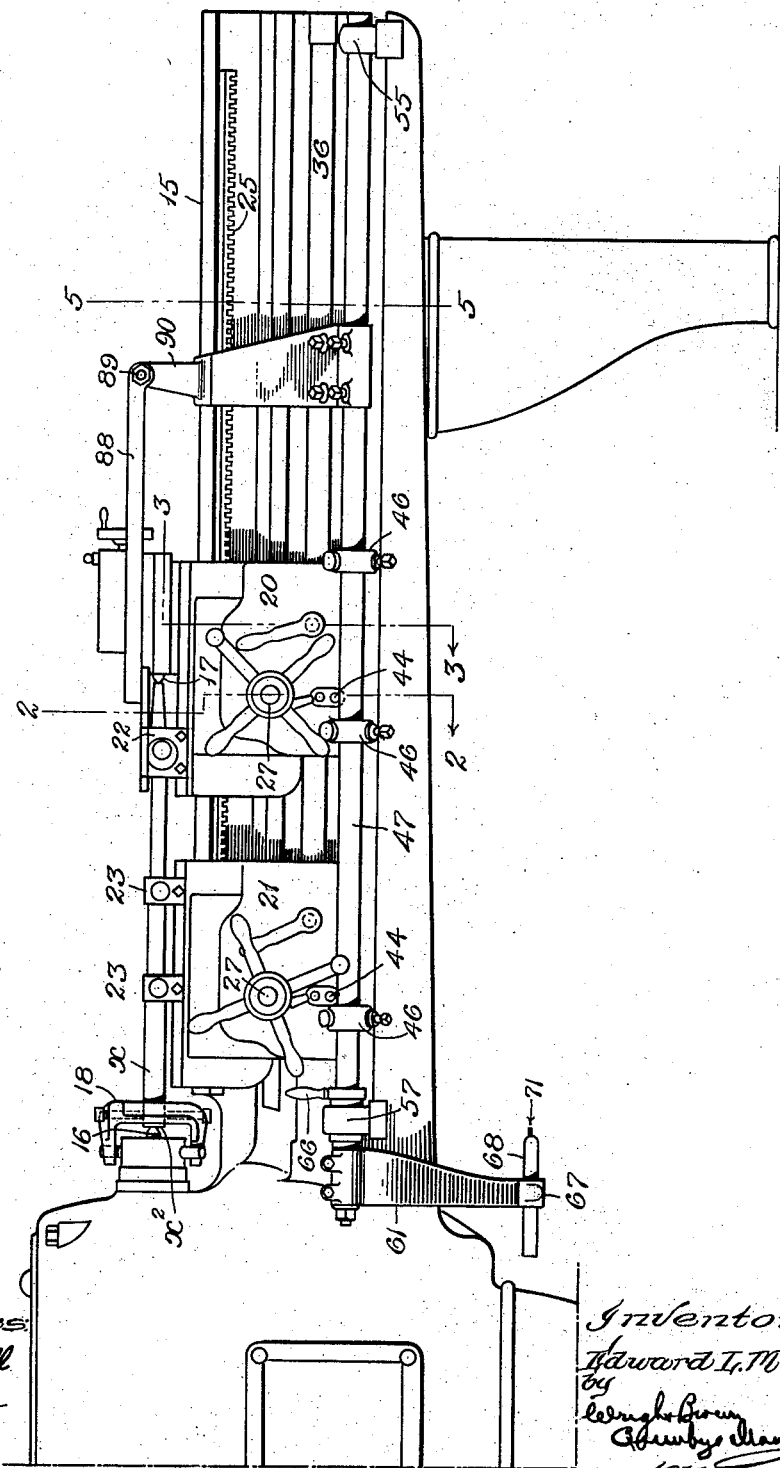

E. L. MILLS.
LATHE.
APPLICATION FILED JULY 22, 1911.

1,027,496.

Patented May 28, 1912.
5 SHEETS—SHEET 1.

Witnesses
W. P. Abell
Harry L. Allen

Inventor:
Edward L. Mills,
by
Attorneys.

E. L. MILLS.
LATHE.
APPLICATION FILED JULY 22, 1911.
1,027,496.
Patented May 28, 1912.
5 SHEETS—SHEET 2.
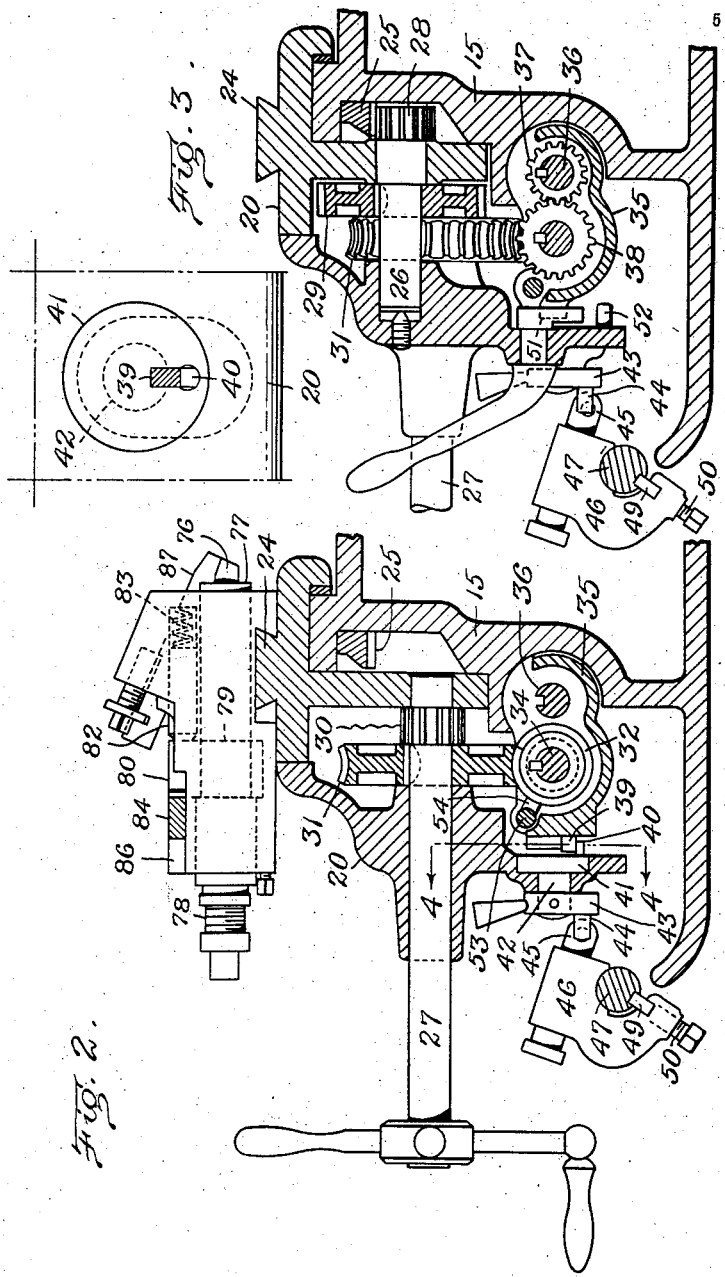

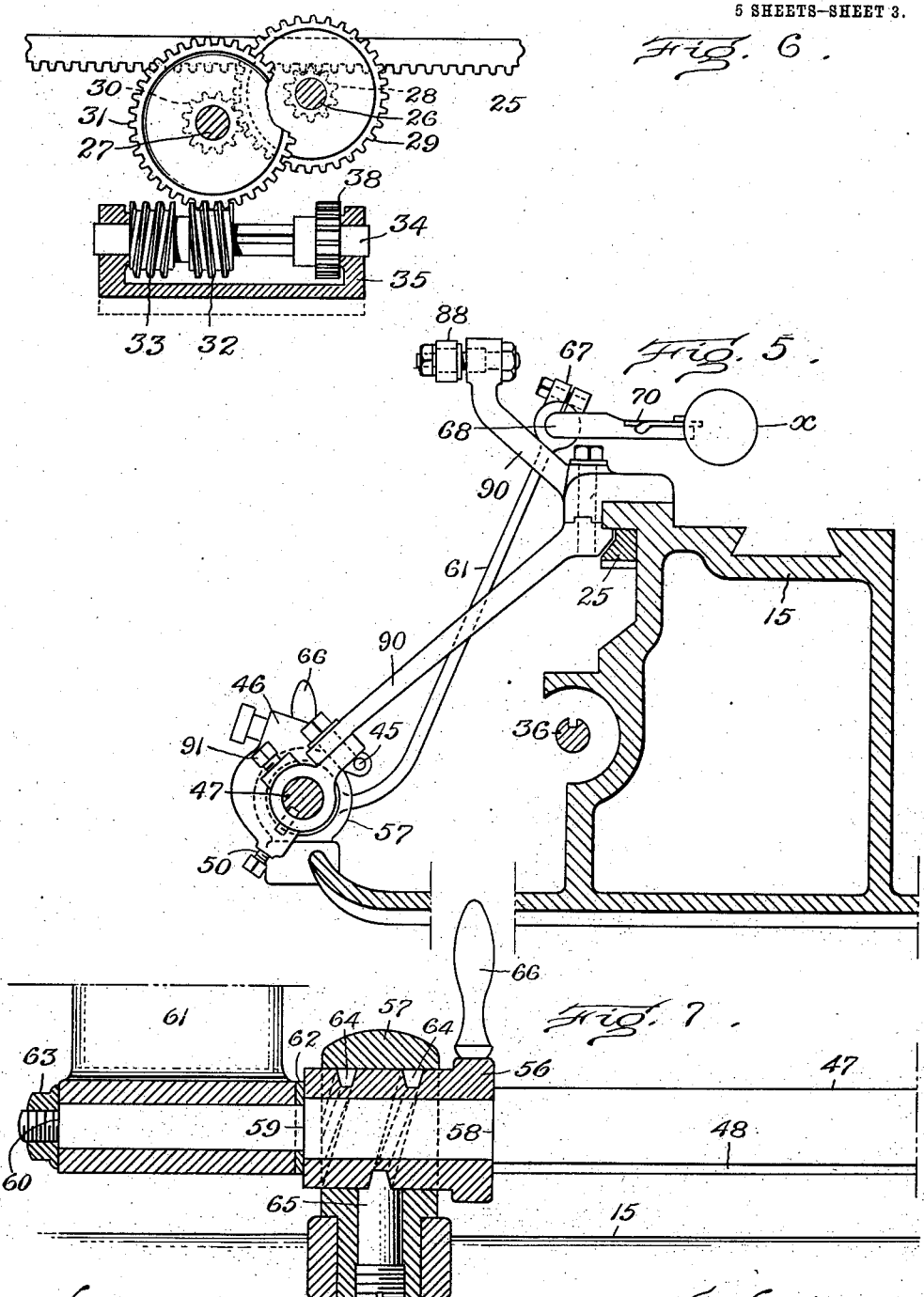

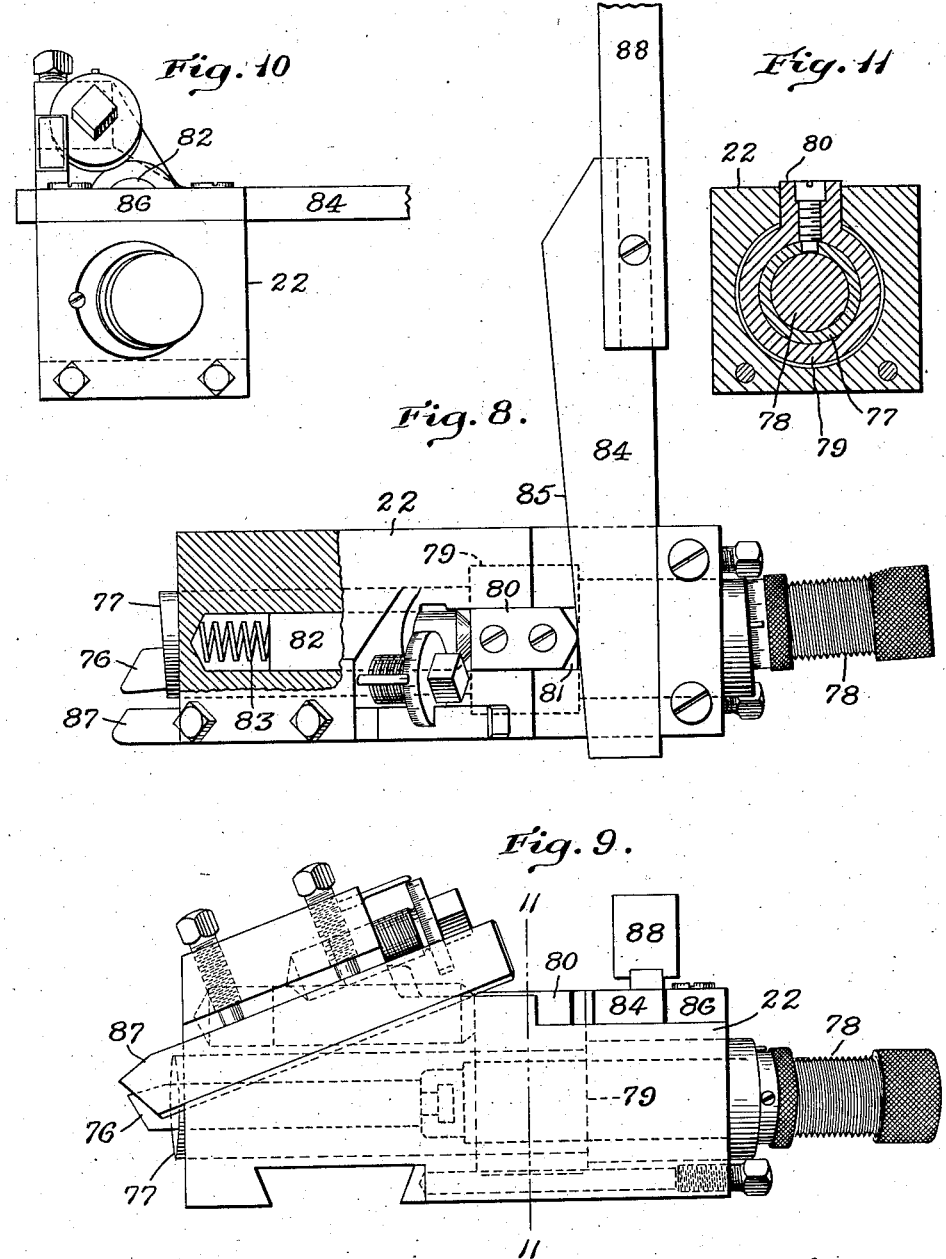

E. L. MILLS.
LATHE.
APPLICATION FILED JULY 22, 1911.
1,027,496.
Patented May 28, 1912.
5 SHEETS—SHEET 5.
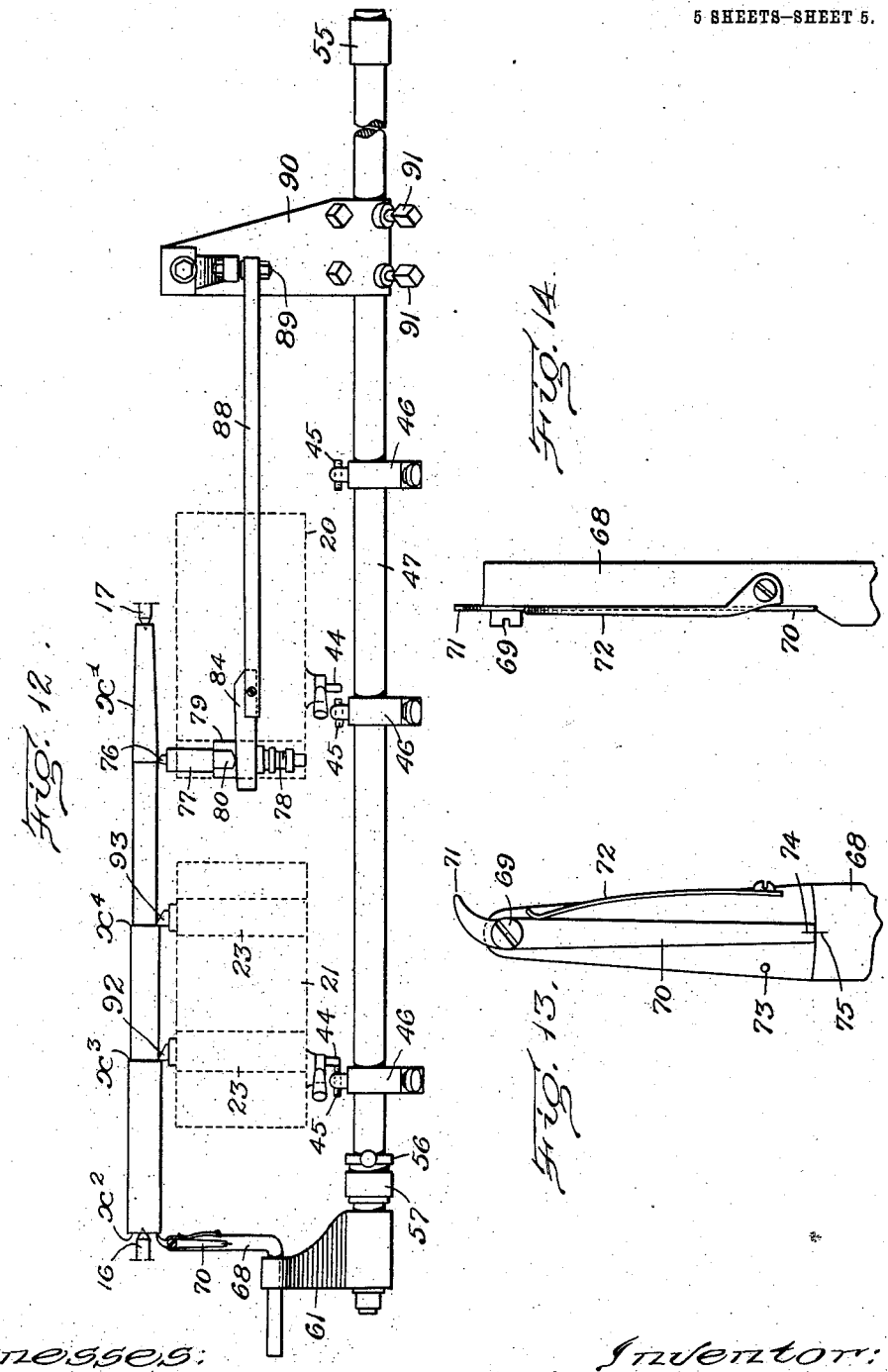

UNITED STATES PATENT OFFICE.

EDWARD L. MILLS, OF FITCHBURG, MASSACHUSETTS, ASSIGNOR TO FITCHBURG MACHINE WORKS, OF FITCHBURG, MASSACHUSETTS, A CORPORATION OF MASSACHUSETTS.

LATHE.

1,027,496.  Specification of Letters Patent.  Patented May 28, 1912.

Application filed July 22, 1911. Serial No. 639,992.

*To all whom it may concern:*

Be it known that I, EDWARD L. MILLS, of Fitchburg, in the county of Worcester and State of Massachusetts, have invented certain new and useful Improvements in Lathes, of which the following is a specification.

This invention relates to lathes of the type in which the tool carriage or carriages are moved by automatic feed mechanism and in which the feeding movement of the carriages is controlled by automatic stop mechanism.

In operating upon a plurality of pieces of work of the same dimensions, it is desirable to equip the lathe with means for determining the relation of the stop mechanism with the work so that the dimensions of one piece of work will not vary from those of another piece of work.

One of the objects of the present invention is to provide improved means adapted to be positioned with relation to a selected surface of the work for determining the position of the stop or stops by which tripping mechanism is actuated to disconnect the feeding means.

The invention is carried out in the following manner: The stop member or members for the tripping mechanism are secured to an adjustable rod which is movable lengthwise in parallelism with the axis of the work. The adjustable rod is provided with a holder on which is mounted an index gage adapted to be moved against a surface of the work, preferably one end of the work. Manually operative means is provided for moving the adjustable rod to the desired position. In practice, the manually operative means is actuated to move the index gage against the work so as to cause the gage to register with a mark on its holder. In this way the position of the stops is determined with relation to the surface of the work with which the gage coacts, and as each successive piece of work is placed in operative position in the lathe the stop members may be positioned at the same relative position for each piece.

The machine illustrated by the accompanying drawings and hereinafter described includes a tool for turning taper surfaces. The tool is mounted upon a feed carriage and is movable transversely of the feed movement in order to vary the distance between the tool and the axis of the work. The transverse movement of the tool is controlled by a templet.

Another object of the invention is to adjust the position of the templet with relation to the work so that the tapering surface may be formed at the desired position on the work with reference to other surfaces of the work. This part of the invention is carried out in the same manner as that explained for adjusting the stops which control the feed mechanism; that is to say, the position of the templet is determined by an index gage adapted to be moved against
a selected surface of the work.

In carrying out the invention, the templet is connected to the rod which positions the stop members and is adjusted simultaneously with the stop members by one and the same
gage.

Of the accompanying drawings which illustrate one form in which the invention may be embodied: Figure 1 represents a front elevation of a lathe equipped with the adjusting mechanism hereinafter described.
Fig. 2 represents a vertical section through one of the feed carriages on a plane indicated in Fig. 1 by line 2—2. Fig. 3 represents a vertical section through another portion of the feed carriage in the plane indicated in Fig. 1 by line 3—3. Fig. 4 represents a vertical section of a portion of the tripping mechanism on a plane indicated in Fig. 2 by line 4—4. Fig. 5 represents a vertical section in the plane indicated in Fig. 1 by line 5—5. Fig. 6 represents a train of gearing for driving one of the feed carriages. Fig. 7 represents a vertical section of means for producing the adjusting movement of the stops and templet. Fig. 8 represents a top plan view, partly in section, of a tool holder for turning taper surfaces. Fig. 9 represents a side elevation of the same tool holder. Fig. 10 represents a front elevation of the tool holder. Fig. 11 represents a cross section of the tool holder in the plane indicated in Fig. 9 by line 11—11. Fig. 12 represents a top plan view of the work, tool, stop members, templet, and mechanism for adjusting the stop members and templet with relation to the work. Fig. 13 represents, on a larger scale, the indicating device which coacts with the work. Fig. 14 represents a side elevation of the indicating device.

The same reference characters indicate the same parts wherever they occur.

The bed of the lathe is indicated as a whole by reference numeral 15.

The work, indicated at $x$, is supported, as shown, by center points 16 and 17 and is driven by a dog 18.

Two feed carriages are indicated at 20 and 21. The feed carriage 20, as illustrated, is equipped with a tool block 22, and the feed carriage 21 is equipped with a plurality of tool blocks indicated at 23. It is to be understood that the number and arrangement of the tool blocks for each carriage may be varied at will. As shown by Figs. 2 and 3, the feed carriages are provided with a dovetail rib 24 upon which the tool blocks are clamped so as to fix the position of the tool blocks with relation to the carriages. Each tool carriage is provided with suitable feed gearing such, for example, as that shown by Figs. 2, 3 and 6, which coöperates with a feed rack 25 affixed to the bed of the lathe.

The feed gearing is of well known construction, but a brief description of it may serve to explain the utility of the registering means by which the tripping mechanism is controlled.

Each feed carriage is provided with suitable bearings for two shafts which are indicated at 26 and 27. The shaft 26 is provided with a pinion 28 and a larger gear 29, both of which are fixed to the shaft. The pinion 26 coöperates with the rack 25, and the gear 29 coöperates with a pinion 30 affixed to the shaft 27. A gear 31, also affixed to the shaft 27, is adapted to be driven by worms 32 and 33. The pitch of one worm is opposed to that of the other and either of the worms may be placed in operative engagement with the gear 31 in order to feed the carriage in one direction or the other. As shown by Fig. 6, the worm 32 is in operative engagement with the gear 31. The two worms are fixed with relation to each other and are splined upon a shaft 34 mounted in a movable hanger 35. The hanger is mounted within the carriage so as to travel with the carriage, but it is otherwise movable to the position indicated by dotted lines in Fig. 6 for the purpose of disconnecting the driving worm from the gear 31. The hanger is mounted upon a feed shaft 36 which extends the length of the lathe and which is driven in any suitable manner by gearing contained in the gear case at the left of the lathe. A pinion 37 splined upon the feed shaft 36, is contained within the hanger so as to travel with the feed carriage. This pinion drives a pinion 38 affixed upon the shaft 34. A projection 39 on the front side of the hanger is adapted to rest upon a stud 40 to support the hanger in driving position. The stud 40 is a part of tripping mechanism by which the front of the hanger is released so that it may drop away from the gear 31 to disconnect the driving mechanism. As shown by Figs. 2 to 4, the stud 40 is affixed to a disk 41 which has a stem 42 mounted in a bearing in the feed carriage. A trip lever 43 is affixed to the stem 42 outside the carriage. A stud 44 projecting from the lever 43 is adapted to abut against a stop screw 45 mounted in a holder 46. As shown by Figs. 1 and 12, a plurality of such stops are mounted upon a rod 47. The stops are adjustable longitudinally of the rod and are provided with means for clamping them in any desired position. For this purpose the rod is provided with a longitudinal groove 48, and each stop holder 46 is provided with a key 49 and with a setscrew 50 by which the key may be forced against the rod in the groove to clamp the stop in any position.

The tripping of the feed mechanism is effected as follows: The feed shaft 36 is driven continuously and feeding movement is transmitted from it through the train of gearing described so as to cause the pinion 28 to travel along the rack 25. When the stud 44 strikes the appropriate screw 45 the disk 41 is turned about its axis sufficiently to move the stud 40 away from the projection 39. The hanger 35, being thus released, swings downwardly about the feed shaft 36 thus separating the driving worm from the gear 31. The downward movement of the hanger 35 is limited by a projection 51 (see Fig. 3) which engages a pin 52 affixed to the feed carriage. When the hanger is in its lower position, the worms 32 and 33 may be shifted, if desired, in order to place the feed gearing in condition to feed in the opposite direction. Any suitable means may be employed for holding the worms in the desired position upon the shaft 34. As shown by Figs. 2 and 3, the hanger 35 is provided with a rod 53 from which a stud 54 projects into the space between the confronting ends of the worms. The rod 53 is adapted to be shifted longitudinally so as to shift the worms. No locking device is illustrated for locking the rod 53, but it may be understood that the rod is provided with a device for this purpose.

The location of the stops with relation to the rod 47 may be determined by experiment or otherwise when producing a sample of the work. When the stops have been adjusted to the desired positions upon the rod, it is only necessary to position the rod with relation to the work in order to place the lathe in condition for operating upon a series of pieces of work of the same dimensions.

The mechanism hitherto described does not embody the novel features of the present invention, but is effected in a manner which will be understood after further description.

The stop rod 47 is mounted in suitable bearings, one of which is indicated at 55. The other bearing for the rod is a sleeve 56 which is movably mounted in a bearing in a support 57 affixed to the bed of the lathe. The rod is turned to provide three shoulders which are indicated at 58, 59 and 60. The sleeve 56 is confined between the shoulders 58 and 59 and is free to rotate with relation to the rod. Between the shoulders 59 and 60 is mounted an arm 61 which supports a movable index gage hereinafter described. As shown by Fig. 7, a washer 62 is interposed between the arm 61 and the shoulder 59. The arm and washer are confined by a nut 63 so as to prevent movement of the arm lengthwise of the rod. The arm, however, is free to turn about the rod. A spiral groove 64 is formed in the exterior of the sleeve 56 and is occupied by the reduced end of a stud 65 contained in the support 57. The stud 65 is, in effect, a nut, because when the sleeve 56 is turned, endwise movement is imparted to it by reason of the engagement of the stud with the spiral surfaces which form the groove 64. The sleeve is provided with a handle 66 by which it may be turned. From the foregoing description it is apparent that when the sleeve 56 is turned in one direction or the other the rod 47 and arm 61 will be moved along the axis of the rod.

The arm 61 is provided with a gage which is illustrated by Figs. 1, 5, 12, 13 and 14. The free end of the arm is provided with a clamp 67 adapted to hold a bent rod 68 in various positions. One end of the rod is formed to provide a bearing for a relatively movable gaging member 70. The said member is pivotally mounted upon the rod by a pivot member such as a screw 69. One end of the gage member is curved and preferably pointed as indicated at 71 for engagement with the end of the work mounted on the center point 16. A spring 72 acting against the gage normally holds the same against a stop 73 projecting from the rod 68. When the point 71 is moved against the work as shown by Fig. 12, the gage may be caused to coöperate with a portion of its holder to give a sight indication. The gage is provided with a mark 74 which is adapted to register with a mark 75 on the holder as shown by Fig. 13.

The arm 61, being movable about the rod 47, is adapted to hang in the position shown by Fig. 1 when not in use. In using the gage, the arm may be moved to the position shown by Figs. 5 and 12 to place the point 71 in alinement with the work. The handle 66 may then be manually turned so as to move the point 71 against the end of the work until the mark 74 registers with the mark 75. This movement of the handle 66 imparts longitudinal movement to the stops 45 and places the stops in the desired position with relation to the end of the work, assuming that the stops have been previously placed in the desired positions with relation to the rod 47. The arm 61 may be restored to the position shown by Fig. 1 after the gage has served its purpose. As each successive piece of work is placed in the lathe, the stops may be placed in the desired position with relation to the work by using the gage in the manner explained.

The stop-registering mechanism serves another purpose according to the present invention. The tool block 22 shown by Figs. 1, 2, 8, 9, 10, 11 and 12, contains a relatively movable tool for turning taper surfaces. The tool holder itself is not claimed in this application but is claimed in a co-pending application, Serial Number 634,814, filed June 7, 1911. A description of this tool holder will be necessary in order to explain the manner in which it is controlled by the registering mechanism. The tool is indicated at 76. It is mounted in a plunger 77 which has a sliding bearing in the block 22. The sliding movement of the plunger 77 is transverse to the axis of the work. An adjusting screw 78 threaded in the plunger 77 is engaged with the rear end of the tool, as shown by Fig. 9. This adjusting device is adapted to adjust the tool with relation to the plunger. A collar 79 affixed to the plunger is employed for moving the plunger toward and from the work. On the upper side of the collar is a block 80 which projects through a slot 81 in the block 22. A barrel 82, contained in a socket in the block 22, is subject to the tension of a spring 83. The barrel engages one face of the block 80 and normally retracts the tool from the work. The tool is held against the work by a templet 84, the working surface 85 of which engages the block 80. The opposite face of the templet has sliding engagement with a plate 86 affixed to the block 22. The templet is mounted so as to be stationary, and as the block 80 travels along the surface 85 by reason of the feeding movement of the carriage, the tool is moved transversely of the work in order to produce a surface corresponding to the surface 85. Figs. 8 to 10 include a fixed tool 87 which is not affected by the templet but which is controlled by the stop mechanism in the manner hereinbefore explained. The templet is affixed to a rod 88, as shown by Figs. 1 and 12. The rod is pivotally connected by a stud 89 with a bracket 90 secured to the stop rod 47. The bracket is longitudinally adjustable along the stop rod and is provided with setscrews 91 by which it may be secured at the desired position on the rod, From the foregoing description it may be seen that longitudinal movement of the stop rod will effect corresponding movement of the templet so as to govern the diameter and location of the tapering portion $x'$ of the work. The templet, being mounted in this way, is adapted to be removed from operative position by swinging the rod 88 upwardly about its pivot stud 89. The rod may be turned so as to extend in the opposite direction from its pivot stud and may be supported by any available support while not in use, and the carriage 20 may be fed to cause the fixed tool to act upon the work while the retractory tool 76 is not in use.

Referring to Fig. 12, it will be seen that the registering mechanism is adapted to determine the range of action of the several tools in the following manner: The end of the work which is used as the basis for determining the position of the various stops and the templet is indicated at $x^2$. The tools affixed to the carriage 21 are indicated at 92 and 93. The limits to which the tools 92 and 93 may go are indicated at $x^3$ and $x^4$, these limits being determined by the stop at the left of the rod 47. The distance between the tapering portion $x'$ and the end $x^2$ is determined by the adjustment of the templet, this also being governed by the end $x^2$. The range of the fixed tool 87 on the carriage 20 would be limited by the tripping of the feed mechanism as determined by the second stop on the rod 47.

It is to be noted that the index gage 70 does not depend on the sense of touch for rendering an indication, because it is adapted to move past the indicating mark 75 and does not resist the adjusting movement when in registering position. This feature is considered important, because there is no possibility of bending or springing the registering mechanism when the index gage is in indicating position. It is incumbent upon the attendant to take visual observations of the gage in order to obtain the desired indication, and in no way can the attendant obtain the desired indication by the sense of touch. This form of indicating device enables the attendant to obtain the desired adjustment with the utmost accuracy.

I claim:

1. In a metal-working machine, a tool carriage, feeding means for said carriage, an adjustable stop, a holder connected to said stop so as to be adjustable therewith, said holder having an index mark and a relatively movable index gage adapted to be positioned by engagement with the work to coöperate with said mark, and trip mechanism on said carriage adapted to be operated by engagement with said stop to render said feeding means inoperative.

2. In a metal-working machine, a tool carriage, feeding means for said carriage, an adjustable stop, a holder connected to said stop so as to be adjustable therewith, said holder having an index mark and an index gage pivoted to be positioned by engagement with the work to coöperate with said mark, the fulcrum of said index gage being nearer to the work-engaging portion than to the indicating portion, whereby the movement of the indicating portion is multiplied, and trip mechanism on said carriage adapted to be operated by engagement with said stop to render the feeding means inoperative.

3. In a metal-working machine, a tool carriage, feeding means for said carriage, an adjustable stop, a holder connected to said stop so as to be adjustable therewith, said holder having an index mark and a relatively movable index gage adapted to register with said mark, said index gage being adapted to be operated by engagement with the work and to move in either direction from registering position, and trip mechanism on said carriage adapted to engage said stop and be operated thereby to render the feeding means inoperative.

4. In a metal-working machine, a tool carriage, feeding means for said carriage, an adjustable stop, a holder connected to said stop so as to be adjustable therewith, said holder having a relatively movable spring-pressed index gage adapted to be moved against the work by adjusting movement of said stop, said index gage being adapted to register with a portion of its holder to give a sight indication of the adjustment, and trip mechanism on said carriage adapted to engage and be operated by said stop to render the feeding means inoperative.

5. In a metal-working machine, a tool carriage, feeding means therefor, an adjustable stop rod, a stop adjustably mounted on said rod, a holder mounted so as to partake of adjusting movement of said rod, said holder having a relatively movable index gage adapted to partake of said adjusting movement to be thereby moved against the work, said holder and index gage having coöperative portions adapted to give a sight indication of the adjustment, and trip mechanism on said carriage adapted to be moved against said stop and thereby operated to render the feeding means inoperative.

6. In a metal-working machine, a carriage, feeding means therefor, a tool mounted on the carriage so as to be movable toward and from the work, an adjustable templet for guiding the tool, and a holder connected with said templet so as to partake of adjusting movement thereof, said holder having a relatively movable index gage adapted to be moved against the work by said adjusting movement, said holder and index gage having coöperative portions adapted to give a sight indication of the adjustment.

7. In a metal-working machine, a carriage, feeding means therefor, a tool mounted on the carriage so as to be movable toward and from the work, an adjustable member, a templet connected with said member so as to partake of adjusting movement thereof, and a holder connected with said adjustable member so as to partake of said adjusting movement, said holder having a relatively movable index gage adapted to be moved against the work by said movement and to coöperate with said holder to give a sight indication of the adjustment, said holder being otherwise movable with relation to said adjusting member so as to carry said index gage to and from coöperative relation with the work.

8. In a metal-working machine, a tool carriage, feed mechanism therefor, an adjustable member, a stop connected with said member so as to partake of adjusting movement thereof, trip mechanism on the carriage adapted to be moved against said stop to be operated thereby to render the feed mechanism inoperative, and a holder connected with said adjustable member so as to partake of adjusting movement thereof, said holder having a relatively movable index gage adapted to be moved against the work by said adjusting movement and to coöperate with the holder to give a sight indication of the adjustment, said holder being otherwise movable with relation to said adjustable member to carry said index gage to and from coöperative relation with the work.

9. In a metal-working machine, a feed carriage, a tool mounted thereon so as to be movable toward and from the work, an adjustable templet for the tool, a holder connected with the templet so as to partake of adjusting movement thereof, and an index gage movably mounted on said holder to be moved against the work by said adjusting movement, said index gage and holder having coöperative parts adapted to give a sight indication of the adjustment.

10. In a metal-working machine, a feed carriage, feed mechanism therefor, a tool mounted on the carriage so as to be movable toward and from the work, an adjustable templet for the tool, said tool being adapted to follow the templet as the carriage is fed, an adjustable stop, trip mechanism on the carriage adapted to be moved against said stop and thereby operated to render the feed mechanism inoperative, said stop and said templet being connected so as to partake of the same adjusting movement, and a holder connected with said stop and templet so as to partake of said adjusting movement, said holder having a relatively movable index gage adapted to be moved against the work by said adjusting movement and thereby moved with relation to its holder, said holder and index gage having coöperative portions adapted to give a sight indication of the adjustment.

11. In a metal-working machine, a feed carriage, feed mechanism therefor, a tool mounted on said carriage, an adjustable stop, trip mechanism on said carriage adapted to engage and be operated by said stop to render the feed mechanism inoperative, manually operative means on the machine frame adapted to adjust said stop and hold it rigidly in position, and a holder connected with said stop so as to partake of adjusting movement thereof, said holder having a relatively movable index gage adapted to be moved against the work by said movement and thereby moved with relation to its holder, said holder and index gage having coöperative portions adapted to give a sight indication of the adjustment.

12. In a metal-working machine, a feed carriage, feed mechanism therefor, a tool mounted on the carriage so as to be movable toward and from the work, an adjustable templet for the tool, manually operative means on the machine frame and connections to said templet for adjusting the templet and holding it in position, and a holder connected with said templet so as to partake of adjusting movement thereof, said holder having a relatively movable index gage adapted to be moved against the work by said adjusting movement and thereby moved with relation to its holder, said holder and index gage having coöperative portions adapted to give a sight indication of the adjustment.

13. In a metal-working machine, a plurality of feed carriages each having feed mechanism and trip mechanism for the feed mechanism, a driver for said feed mechanisms, a tool mounted on each carriage, a rod parallel to the line of travel of the feed carriages, stops fixed to said rod for operating the trip mechanisms to stop the carriages, said rod being longitudinally adjustable, and a holder connected to said rod so as to partake of adjusting movement thereof, said holder having a relatively movable index gage adapted to be moved against the work by said adjusting movement, said holder and index gage having coöperative portions adapted to give an indication of the adjustment.

14. In a metal-working machine, a tool, a carriage therefor, said tool being movable toward and from the work with relation to the carriage, feed mechanism for the carriage, a rod extending parallel to the line of travel of the carriage, said rod being longitudinally adjustable, a stop connected with the rod so as to partake of adjusting movement thereof, trip mechanism on the carriage adapted to be operated by said stop to render the feed mechanism inoperative, a templet for the tool, said templet being connected with said rod so as to partake of adjusting movement thereof, and a holder connected with said rod so as to partake of said adjusting movement, said holder having a relatively movable index gage adapted to be moved against the work by said adjusting movement, said holder and index gage having coöperative portions adapted to indicate the adjustment.

In testimony whereof I have affixed my signature, in presence of two witnesses.

EDWARD L. MILLS.

Witnesses:
 LOWELL H. STEARNS,
 GEORGE S. RICHARDSON.

---

Copies of this patent may be obtained for five cents each, by addressing the " Commissioner of Patents, Washington, D. C."